(12) United States Patent
Milligan et al.

(10) Patent No.: US 7,541,219 B2
(45) Date of Patent: Jun. 2, 2009

(54) INTEGRATED METALLIC CONTACT PROBE STORAGE DEVICE

(75) Inventors: Donald J. Milligan, Corvallis, OR (US); Kenneth J. Abbott, Corvallis, OR (US); John Paul Harmon, Albany, OR (US)

(73) Assignee: Seagate Technology LLC, Scotts Valley, CA (US)

( * ) Notice: Subject to any disclaimer, the term of this patent is extended or adjusted under 35 U.S.C. 154(b) by 699 days.

(21) Appl. No.: 10/884,839

(22) Filed: Jul. 2, 2004

(65) Prior Publication Data

US 2006/0003493 A1 Jan. 5, 2006

(51) Int. Cl.
*H01L 21/00* (2006.01)
*H01L 21/44* (2006.01)
*H01L 21/48* (2006.01)
*H01L 21/50* (2006.01)

(52) U.S. Cl. .............................. 438/117; 438/52; 438/54

(58) Field of Classification Search ................. 438/117, 438/48, 52, 51, 54
See application file for complete search history.

(56) References Cited

U.S. PATENT DOCUMENTS

| | | | | |
|---|---|---|---|---|
| 4,268,537 A | 5/1981 | Goodman | | |
| 4,740,705 A * | 4/1988 | Crewe | ..................... | 250/423 F |
| 5,221,415 A | 6/1993 | Albrecht et al. | | |
| 5,665,648 A | 9/1997 | Little | | |
| 5,994,160 A | 11/1999 | Niedermann et al. | | |
| 6,075,585 A * | 6/2000 | Minne et al. | ................... | 355/71 |
| 6,242,929 B1 * | 6/2001 | Mizuta | ....................... | 324/754 |
| 6,245,444 B1 | 6/2001 | Marcus et al. | | |
| 6,291,140 B1 | 9/2001 | Andreoli et al. | | |
| 6,328,902 B1 | 12/2001 | Hantschel et al. | | |
| 6,475,822 B2 | 11/2002 | Eldridge et al. | | |
| 6,504,152 B2 | 1/2003 | Hantschel et al. | | |
| 6,520,778 B1 | 2/2003 | Eldridge et al. | | |
| 6,528,350 B2 | 3/2003 | Fork | | |
| 2002/0197761 A1 | 12/2002 | Patel et al. | | |
| 2003/0036215 A1 | 2/2003 | Reid | | |
| 2003/0081651 A1 | 5/2003 | Gianchandani et al. | | |
| 2003/0100145 A1 | 5/2003 | Fork | | |
| 2003/0235272 A1 * | 12/2003 | Appleby et al. | ............. | 378/147 |

OTHER PUBLICATIONS

Vettiger, P. et al., "The 'Millipede'—More than one thousand tips for future AFM data storage," International Business Machines (IBM), J. Res. Develop., vol. 44, No. 3, pp. 323-340 (May 2000).

* cited by examiner

*Primary Examiner*—Chuong A. Luu
(74) *Attorney, Agent, or Firm*—Robert P. Lenart, Esq.; Benjamin T. Queen, II; Pietragallo Gordon Alfano Bosick & Raspanti, LLP

(57) ABSTRACT

A mass storage device includes a probe that has a cantilever having a first end region operatively connected to a substrate and a second end region rotated in a direction such that the second end region is opposed to the first end region. A tip is disposed on the second end region, with the tip pointing in a direction opposed to the first end region.

4 Claims, 4 Drawing Sheets

INTEGRATED METALLIC CONTACT PROBE STORAGE DEVICE

BACKGROUND

The present invention relates generally to probe storage devices, and more particularly to an integrated metallic contact probe storage device.

Contact probe storage devices are often integrated with circuits for use in a variety of applications, including, but not limited to atomic force microscopes. A typical contact probe storage device is generally made from a single crystal silicon cantilever and a tip formed on an SOI (silicon-on-insulator) wafer. However, the SOI wafers may be quite expensive and may be difficult to integrate with a complementary metal oxide semiconductor (CMOS) for the contact probe storage device.

Deflections may be achieved with a highly stressed film deposited cantilever. However, the deflections are generally very small, generally less than about two microns, which may make the device susceptible to particles. Additionally, the close proximity of the cantilever to the substrate generally requires an undercut of the cantilever for thermal isolation. This undercut may substantially reduce the area available for integration of CMOS devices and interconnects.

The tip of such a device is generally sharpened by thermal oxidation, which is a high temperature process. Such high temperature processes may not in some instances be compatible with CMOS, which may make it difficult to integrate CMOS with the contact probe storage device.

It would be desirable to form a contact probe storage device that will be less susceptible to particles while at the same time having room for the integration of CMOS devices and interconnects. Further, it would be desirable that the contact probe storage device be formed under generally low temperature conditions if the contact probe storage device has CMOS devices integrated therewith.

SUMMARY

The present invention substantially solves the drawbacks enumerated above by providing a mass storage device including a probe that has a cantilever having a first end region operatively connected to a substrate and a second end region rotated in a direction opposed to the first end region. A tip is disposed on the second end region, with the tip pointing in a direction opposed to the first end region.

BRIEF DESCRIPTION OF THE DRAWINGS

Objects, features and advantages of the present invention will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION

As will be described further hereinbelow, in an embodiment of the contact probe, a rotated cantilever with a tip generally advantageously results in a small gap between the probe tip and the media substrate, which may result in higher sensitivity, larger deflections, and potentially less susceptibility to small particles. Further, in an embodiment of the contact probe, CMOS devices may be integrated therewith. Still further, an embodiment of the method for forming a contact probe provides a process using generally low temperature conditions.

Figure 1:
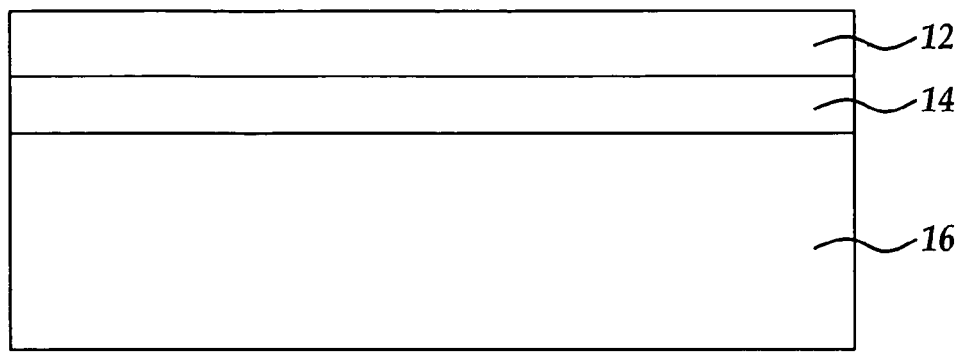
FIG. 1 is a semi-schematic view of an embodiment of the method of making a contact probe showing a dielectric layer disposed on an oxide layer.

Referring now to FIG. 1, an embodiment of making a contact probe (generally designated as 10 in FIG. 7) includes the step of depositing a dielectric layer 12 on an oxide layer 14. It is to be understood that any suitable dielectric material may be chosen. In a non-limitative embodiment, the dielectric layer 12 is a suitable nitride, carbide, or mixtures thereof.

The oxide layer 14 is generally not a thermal oxide, thereby advantageously keeping the temperatures low in an embodiment of the process. In an embodiment, the oxide layer 14 is silicon dioxide. The oxide layer 14 may be deposited using plasma enhanced chemical vapor deposition (PECVD) or physical vapor deposition (PVD) (e.g. sputtering or evaporation). Other suitable low temperature deposition techniques include, but are not limited to, spin-on-glass depositions, low temperature chemical vapor depositions (CVD), or atomic layer depositon (ALD).

In an embodiment, the oxide layer 14 is disposed on a substrate 16. It is to be understood that any suitable substrate 16 may be chosen. Some non-limitative examples of suitable substrates include, but are not limited to single crystal silicon, polycrystalline silicon, silicon oxide containing dielectric substrates, alumina, sapphire, ceramic, or mixtures thereof.

In an alternate embodiment of the contact probe 10, the dielectric layer 12 is first disposed on the substrate 16 and then the oxide layer 14 is deposited on the dielectric layer 12.

The dielectric layer 12 is deposited using any suitable low temperature deposition technique. In an embodiment, PECVD is used to deposit the dielectric layer 12 on the oxide layer 14. Other non-limitative examples of suitable deposition techniques include atomic layer deposition, low temperature chemical vapor deposition (CVD), physical vapor deposition (PVD) sputtering, PVD evaporation and spin-on-glass. In a non-limitative example where the previously described processing steps do not limit the temperature, then the dielectric layer 12 may be deposited using high temperature CVD.

Figure 2:
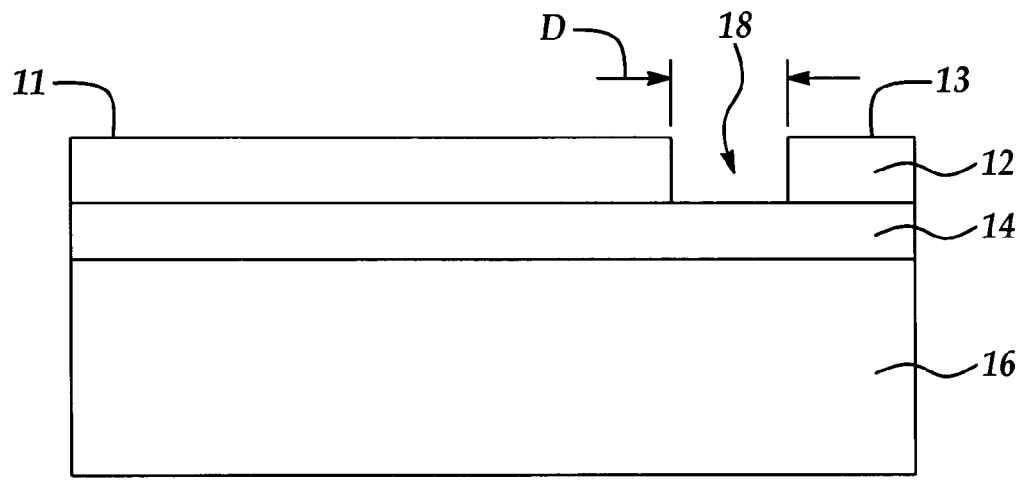
FIG. 2 is a semi-schematic view of an embodiment of the method of making a contact probe showing an opening in the dielectric layer.

Now referring to FIG. 2, an embodiment of the method includes the step of forming an opening 18 in the dielectric layer 12. In an embodiment, the shape of the opening 18 is cylindrical. It is to be understood that the opening 18 may be any suitable size and shape. In a non-limitative example, the opening 18 has a diameter D ranging between about 0.5 μm and about 2 μm.

It is to be understood that the dielectric layer 12 has two end regions 11, 13 opposite each other. In an embodiment, the opening 18 is formed at one end region 13 in the dielectric layer 12. Further, it is to be understood that the opening 18 does not substantially extend into the oxide layer 14.

In an embodiment of the method, the opening 18 is formed by any suitable dry etching process. In a further embodiment, the opening 18 is formed by a reactive ion etching (RIE) process. The reactive ion etching process may generally take place at low temperatures, for example, temperatures less than about 100° C. Additionally, the reactive ion etching process may advantageously result in minimizing any undercut and controlling the dimensions of the opening 18.

Figure 3:
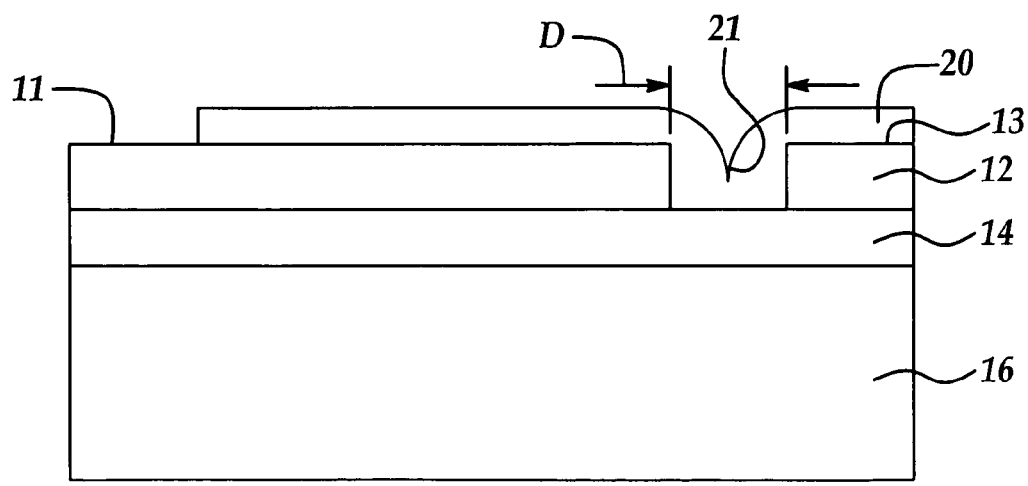
FIG. 3 is a semi-schematic view of an embodiment of the method of making a contact probe showing a sacrificial layer on the dielectric layer and the opening.

Referring now to FIG. 3, an embodiment of the method includes the step of depositing a sacrificial layer 20 on the dielectric layer 12 and in the opening 18. Some non-limitative examples of the sacrificial layer 20 include, but are not limited to at least one of polysilicon, amorphous silicon, silicon dioxide, diamond-like carbon (DLC), or mixtures thereof.

It is to be understood that the deposition technique used depends on the type of sacrificial layer 20 that is used. In an embodiment, physical vapor deposition (PVD) is used to deposit polysilicon, however, PVD generally requires higher temperatures ranging between about 600° C. and about 700° C. In an alternate embodiment, PECVD is used to deposit amorphous silicon. PECVD is generally a lower temperature deposition technique, with temperatures generally ranging between about 100° C. and about 500° C. In an embodiment, the temperatures range between about 350° C. and about 400° C.

In an embodiment, the sacrificial layer 20 forms a crevice 21 in the opening 18. It is to be understood that the sharpness of the crevice 21 may be increased by varying the amount of the sacrificial layer 20 that is deposited in the opening 18 and/or by varying the size of the opening 18. In an embodiment, the sacrificial layer 20 has a thickness ranging between about 0.25 μm and about 1 μm. In a further embodiment, the thickness of the sacrificial layer 20 may be about one half the diameter D of the opening 18.

The method may further include the steps of masking (not shown) the sacrificial layer 20 and etching the sacrificial layer 20.

In an embodiment, etching the sacrificial layer 20 is completed by either a suitable wet etching process or reactive ion etching.

Figure 4:
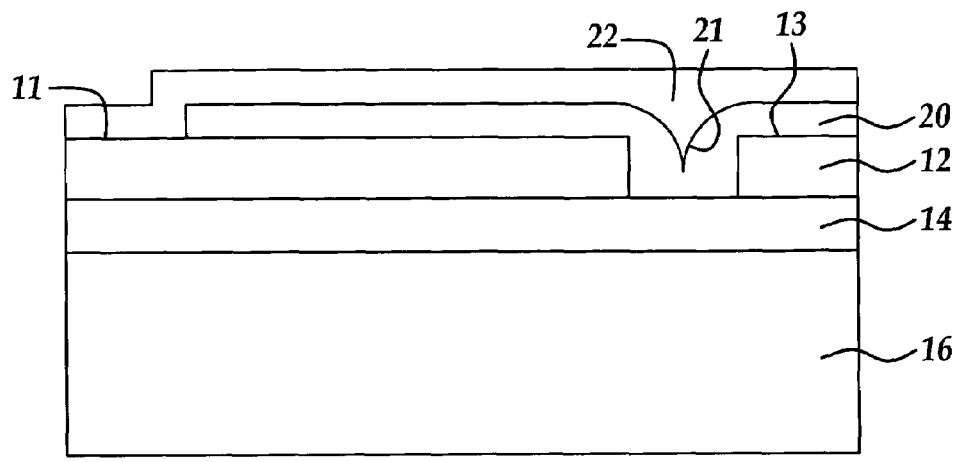
FIG. 4 is a semi-schematic view of an embodiment of the method of making a contact probe showing a metal layer deposited on the sacrificial layer.

Now referring to FIG. 4, an embodiment of the method further includes the step of depositing a metal layer 22 over the sacrificial layer 20. In a non-limitative embodiment, the metal layer 22 is at least one of refractory metals, transition metals, compounds thereof, or mixtures thereof. Some non-limitative examples of the metal layer 22 include, but are not limited to molybdenum chromide, tantalum, tungsten, tantalum nitride, titanium tungsten, compounds thereof, or mixtures thereof.

It is to be understood that the metal layer 22 may be stressed. In an embodiment, the metal layer 22 may have memory characteristics, which allow the metal layer 22 to bend, described further hereinbelow.

In an embodiment, the metal layer 22 is deposited using PVD, non-limitative examples of which include sputter deposition or evaporation deposition.

Figure 5:
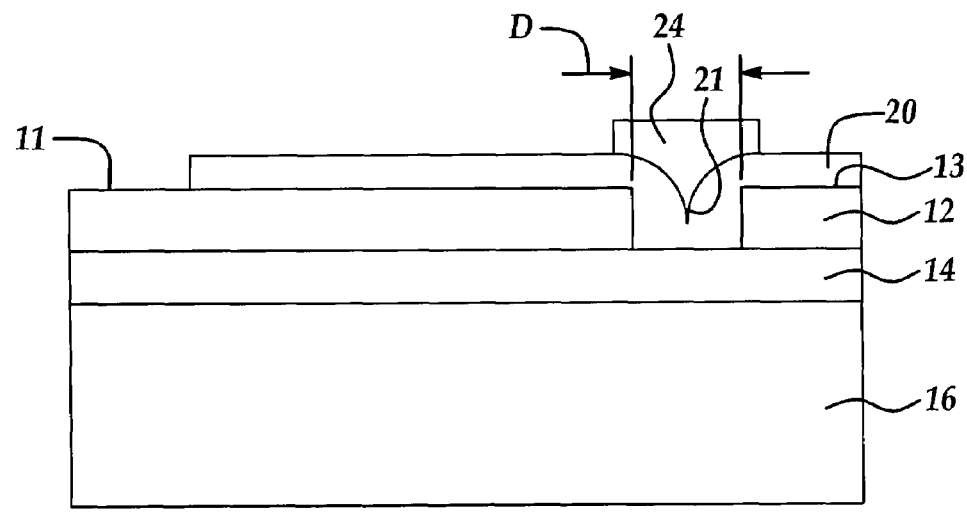
FIG. 5 is a semi-schematic view of an embodiment of the method of making a contact probe showing a resistor bar with a tip.
Figure 5A:
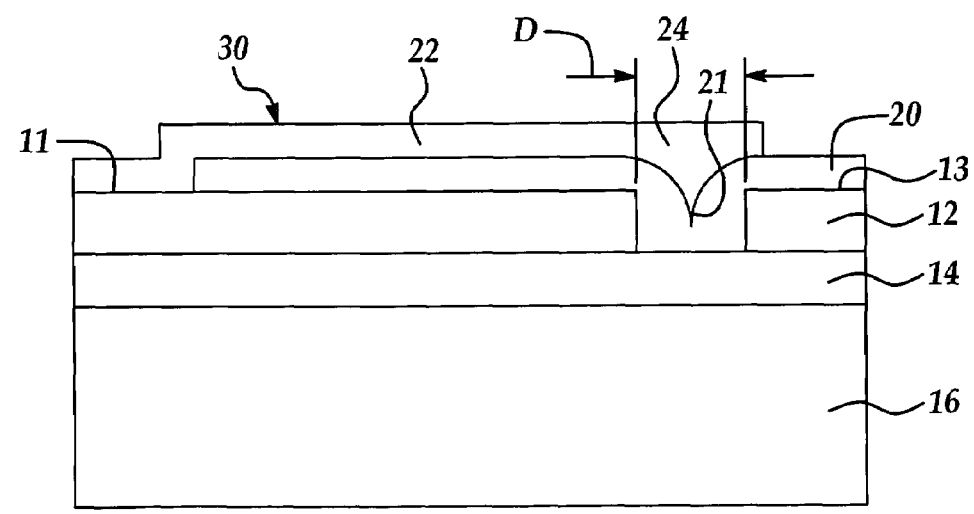
FIG. 5A is a semi-schematic view of an alternate embodiment of FIG. 5 showing a cantilever and the tip.

Referring now to FIGS. 5 and 5A, an embodiment of the method further includes the step of etching the metal layer 22. FIG. 5 shows an embodiment of the method wherein the metal layer 22 is etched to form a resistor bar with a contact tip 24. In an embodiment, the contact tip 24 is initially oriented in a direction such that it points toward the substrate 16.

It is to be understood that the sharpness of the crevice 21 helps to define the sharpness of the contact tip 24. The sharpness of the contact tip 24 may be optimized by varying the diameter D of the opening 18 and/or the thickness of the sacrificial layer 20. In a non-limitative example, the contact tip 24 desirably has a radius of curvature ranging between about 5 nm and about 25 nm.

The step of etching the metal layer 22 may be accomplished by reactive ion etching. In some instances, wet chemical etching may be used, for example in an embodiment where small feature size is generally not essential.

Referring now to FIG. 5A, in an alternate embodiment of the method, the metal layer 22 may optionally be etched to form a cantilever 30 having a contact tip 24. Further, the contact tip 24 may initially be oriented towards the substrate 16. It is to be understood that in an embodiment of the contact probe 10 having a cantilever 30 and contact tip 24 formed from the same metal layer 22, no additional metal layer is necessary to form the cantilever 30.

Figure 6:
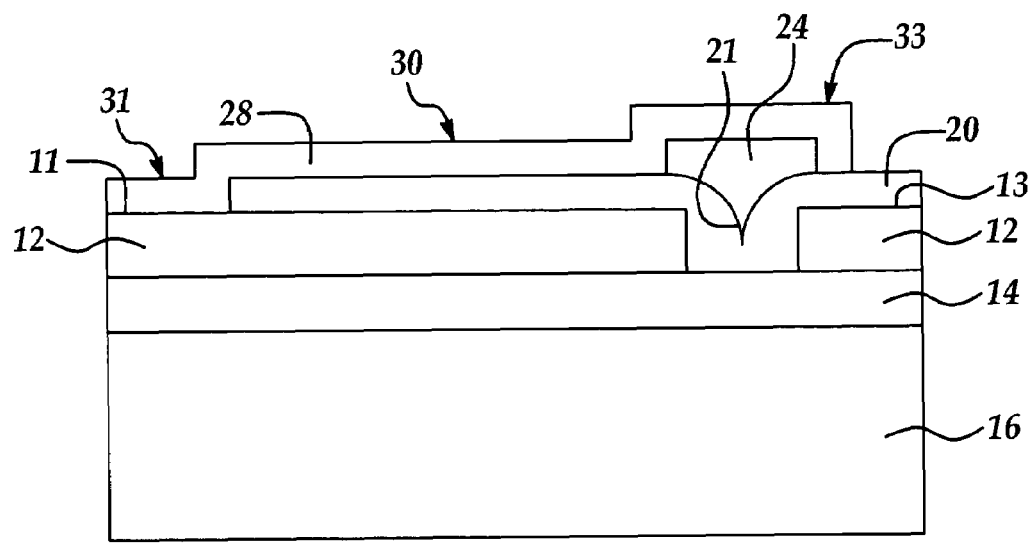
FIG. 6 is a semi-schematic view of an embodiment of the method of making a contact probe showing a metal layer over the resistor bar and tip.

Referring now to FIG. 6, an embodiment of the method may further include the step of depositing a stressed metal layer 28 over the sacrificial layer 20 and the resistor bar with the contact tip 24 to form a cantilever 30 having a resistor bar with a contact tip 24. Cantilever 30 has a first end region 31 and a second end region 33. First end region 31 is connected to one end region 11 of dielectric layer 12 (the dielectric layer 12 being disposed on the oxide layer 14 and the substrate 16).

In a non-limitative embodiment, the stressed metal layer 28 is a refractory metal, a transition metal, compounds thereof, or mixtures thereof. Some non-limitative examples of the stressed metal layer 28 include, but are not limited to at least one of molybdenum chromide, tantalum, tungsten, tantalum nitride, titanium tungsten, compounds thereof, or mixtures thereof.

In an embodiment having the two deposited metal layers 22, 28, the stressed metal layer 28 deposited to form the cantilever 30 may be a lower resistance metal than the metal layer 22 deposited to form the resistor bar with the contact tip 24. Further, it is to be understood that the stressed metal layer 28 may have memory characteristics that cause it to bend.

In an embodiment, the stressed metal layer 28 is deposited using PVD, sputter deposition, or evaporation deposition.

Figure 7:
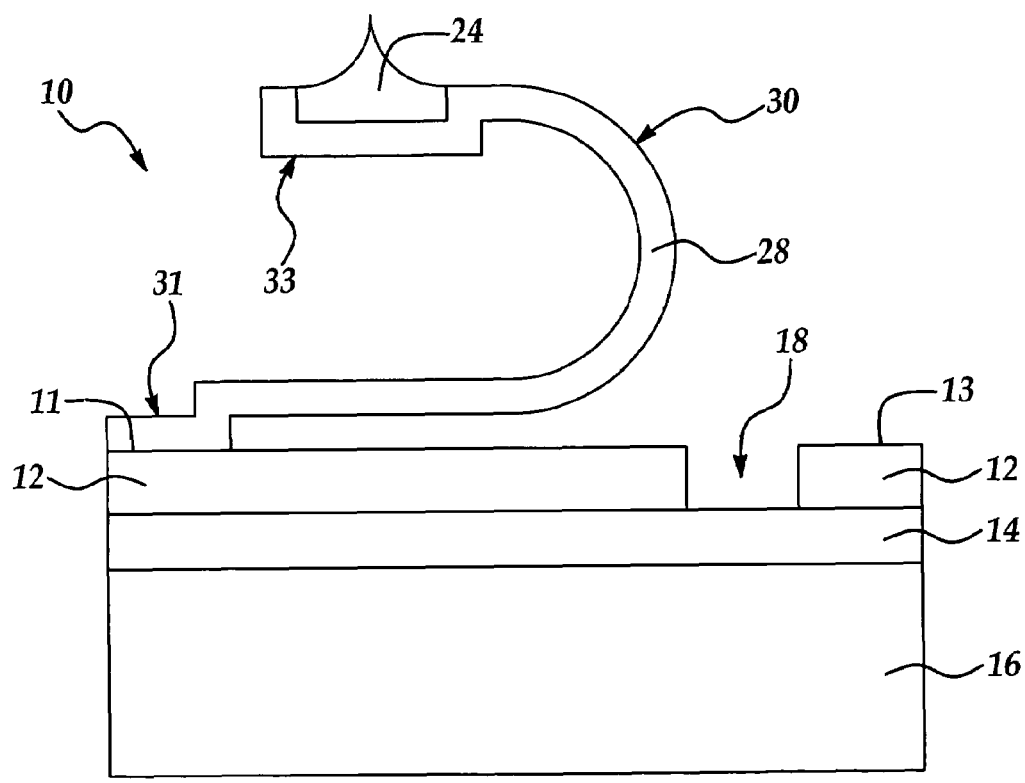
FIG. 7 is a semi-schematic view of an embodiment of the method of making a contact probe showing the cantilever and tip rotated.

Referring now to FIG. 7, the method further includes the step of releasing the cantilever 30 to form an embodiment of the contact probe 10.

It is to be understood that the releasing step may be accomplished by any suitable releasing technique. In an embodiment, wet etching techniques, such as tetramethlyammonium hydroxide (TMAH) release etch and potassium hydroxide (KOH) release etch, may be used. However, these techniques are generally selective to the types of metal and oxide films that are present. In an alternate embodiment, a gaseous etch may be used. A non-limitative example of a suitable gaseous etching technique includes, but is not limited to xenon difluoride release etch.

It is to be understood that the releasing step substantially removes the sacrificial layer 20.

Further, in an embodiment, upon releasing, the memory characteristics of the stressed metal layer 22, 28 cause the cantilever 30 to bend or rotate in a direction such that the second end region 33 is opposed to the first end region 31. In a non-limitative embodiment, the cantilever 30 rotates between about 170° and about 190° during the release step. In another non-limitative embodiment, second end region 33 is rotated about 180° from first end region 31. The tip 24 on the second end region 33 points in a direction opposed to the first end region 31. As such, in this embodiment, the contact tip 24 is oriented about 180° away from its orientation when it 24 was formed (compare FIGS. 4 and 7). It is to be understood that the degrees of rotation listed above are illustrative embodiments and are not to be seen as limiting alternate embodiments of the method.

Figure 8:
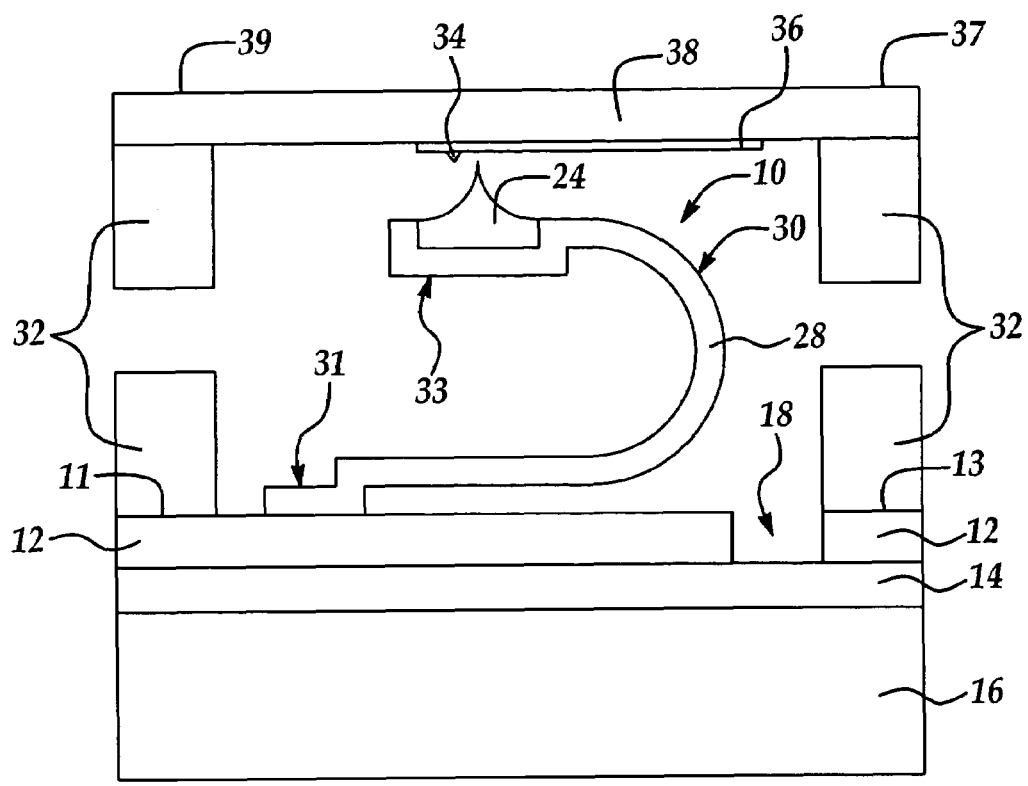
FIG. 8 is a semi-schematic view of an embodiment of the method of making a contact probe showing bond rings deposited on the probe substrate and the media substrate.

Referring now to FIG. 8, a media 34 is deposited on a moving X, Y stage 36. The X, Y stage 36 is connected to a media substrate 38 having two opposite end regions 37, 39. Bond rings 32 are deposited on the two end regions 37, 39 of the media substrate 38.

The method of making an embodiment of the contact probe 10 further includes the step of depositing bond rings 32 on each of the two end regions 11, 13 of the dielectric layer 12.

In an embodiment, the bond rings 32 are selected from any suitable material. Some non-limitative examples of suitable bond ring 32 materials include, but are not limited to silicon dioxide, gold, aluminum, palladium, solder, lead, silicon, glass or mixtures thereof.

It is to be understood that any suitable deposition technique may be used. In an embodiment, the bond rings 32 may be deposited using PVD (non-limitative examples of which include sputter and evaporation deposition) or PECVD.

Further, the method optionally includes the step of patterning the bond rings 32. It is to be understood that any suitable patterning technique may be chosen. In an embodiment, the bond rings 32 may be patterned using photolithography followed by plasma etching or wet chemical etching. The bond rings 32 may also be patterned using a lift-off technique.

Figure 9:
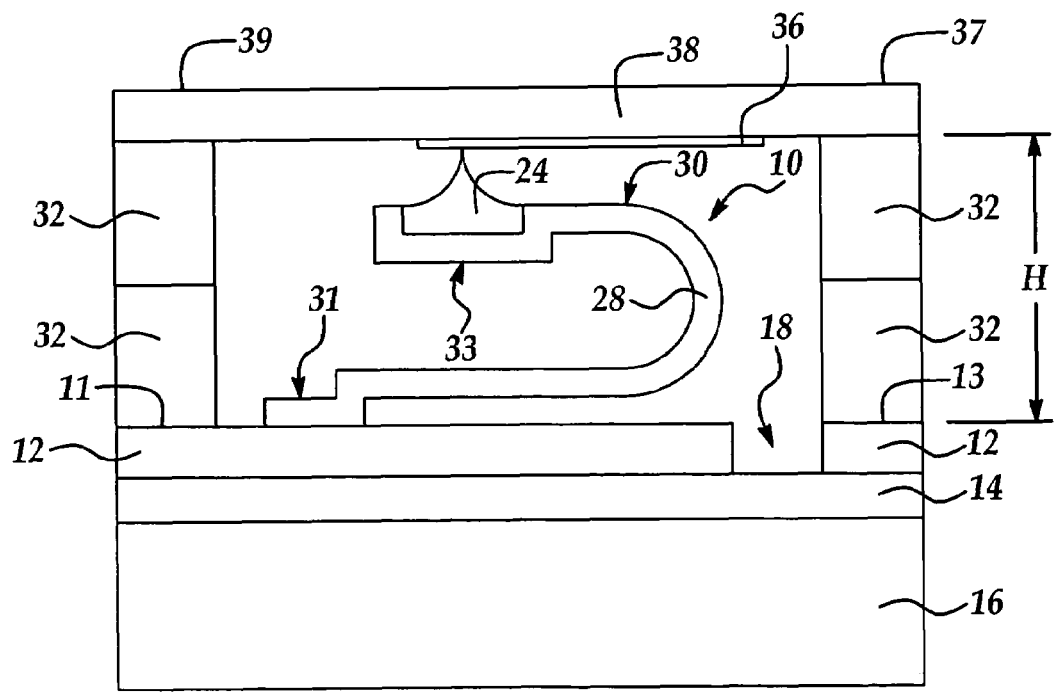
FIG. 9 is a semi-schematic view of an embodiment of the method of making a contact probe showing the probe in contact with the media.

Referring now to FIG. 9, an embodiment of the contact probe 10 may be placed in contact with the media 34 (shown in FIG. 8). In an embodiment, the bond rings 32 located on the dielectric layer 12 and on the media substrate 38 are bonded together. It is to be understood that the bond ring height H may be adjusted so that the desired load is applied to the contact probe 10. In an embodiment, the bond ring height H is about 10 μm.

In an embodiment, the contact tip 24 remains in contact with the media 34 as it is scanned.

It is to be understood that cantilever 30 acts as a loaded spring after the bond rings 32 are bonded together. Further, CMOS devices (not shown) may be integrated therewith, e.g. the CMOS devices may be placed substantially directly under the cantilever 30.

Embodiments as disclosed herein provide many advantages, examples of which include, but are not limited to the following. Embodiments of the method may advantageously result in a relatively low temperature process for making contact probes 10 that are compatible with CMOS devices. Without being bound to any theory, it is believed that the curved metal cantilever 30 of embodiments of the contact probe 10 may advantageously result in larger deflections when scanning media 34, which makes the contact probe 10 advantageously less susceptible to particles. Further, the smaller gap between the media 34 and the contact probe 10 generally advantageously results in higher sensitivity. Another advantageous result is the substantial elimination of a need for an undercut of the cantilever 30 for thermal isolation. Without being bound to any theory, it is believed that the elimination of the undercut may increase the area available for CMOS devices and interconnects.

While several embodiments of have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An apparatus comprising:
   a substantially U-shaped cantilever probe having a first region connected at a first end to a probe substrate and a second region rotated in a direction such that the second region is opposed to the first region, wherein the second region includes a free end; and
   a tip disposed on the second region adjacent to the free end, wherein the tip is oriented in a direction opposed to the first region.

2. The apparatus as defined in claim 1 wherein the probe comprises a stressed metal having memory characteristics.

3. The apparatus as defined in claim 2 wherein the stressed metal is at least one of molybdenum chromide, tantalum, tungsten, tantalum nitride, titanium tungsten, compounds thereof, and mixtures thereof 4. The apparatus as defined in claim 1 wherein the tip comprises at least one of molybdenum chromide, tantalum, tungsten, tantalum nitride, titanium tungsten, compounds thereof, and mixtures thereof.

* * * * *